United States Patent
Ishikawa et al.

(10) Patent No.: US 10,325,367 B2
(45) Date of Patent: Jun. 18, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Ryo Ishikawa, Kawasaki (JP); Kiyohide Satoh, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 241 days.

(21) Appl. No.: 15/377,918

(22) Filed: Dec. 13, 2016

(65) Prior Publication Data
US 2017/0169569 A1    Jun. 15, 2017

(30) Foreign Application Priority Data
Dec. 15, 2015 (JP) ................. 2015-244397

(51) Int. Cl.
*G06K 9/00* (2006.01)
*G06T 7/00* (2017.01)
(Continued)

(52) U.S. Cl.
CPC .......... *G06T 7/0016* (2013.01); *G06K 9/6212* (2013.01); *G06T 7/74* (2017.01);
(Continued)

(58) Field of Classification Search
CPC ..... G06T 7/0016; G06T 7/74; G06T 2210/41; G06K 9/6212
(Continued)

(56) References Cited

U.S. PATENT DOCUMENTS

2010/0166299 A1* 7/2010 Nobori .................. G06T 7/20
                                                                382/162
2014/0212045 A1* 7/2014 Monden .............. G06K 9/6211
                                                                382/190
(Continued)

FOREIGN PATENT DOCUMENTS

JP    2008-212680 A    9/2008
JP    2013-198722 A    10/2013

OTHER PUBLICATIONS

D. Rueckert, et al. "Nonrigid registration using free-form deformations: application to breast MR images;" IEEE Transactions on Medical Imaging; vol. 18, No. 8, pp. 712-721; Aug. 1999.
(Continued)

*Primary Examiner* — Van D Huynh
(74) *Attorney, Agent, or Firm* — Canon USA, Inc., IP Division

(57) ABSTRACT

An information processing apparatus includes a processor and a memory containing instructions that cause the processor to perform operations. The operations include obtaining a group of candidates of corresponding points which are pairs of feature points in a first space and feature points in a second space, calculating a plurality of displacement fields under a plurality of different regularization conditions based on the candidate group, calculating a feature point group which has been subjected to a plurality of displacements by displacing the feature points in the first space by the plurality of displacement fields, and calculating matching degrees of the corresponding points included in the candidate group in accordance with the feature point group which has been subjected to the plurality of displacements.

20 Claims, 4 Drawing Sheets

(51) Int. Cl.
*G06T 7/73* (2017.01)
*G06K 9/62* (2006.01)

(52) U.S. Cl.
CPC .............. *G06T 2207/10081* (2013.01); *G06T 2207/10088* (2013.01); *G06T 2207/30068* (2013.01); *G06T 2210/41* (2013.01)

(58) Field of Classification Search
USPC ........................................................ 382/128
See application file for complete search history.

(56) References Cited

U.S. PATENT DOCUMENTS

| | | | |
|---|---|---|---|
| 2015/0206029 A1* | 7/2015 | Chikano | G06K 9/6211 382/201 |
| 2016/0019706 A1* | 1/2016 | Otomaru | G06T 7/73 345/634 |
| 2016/0125584 A1* | 5/2016 | Suzuki | G06T 11/60 382/131 |
| 2016/0148053 A1* | 5/2016 | Matsuzaki | G06K 9/00711 382/128 |
| 2016/0148380 A1* | 5/2016 | Otomaru | G06K 9/4638 382/294 |

OTHER PUBLICATIONS

Marius Staring, et al; "A rigidity penalty term for nonrigid registration;" Medical Physics, vol. 34, No. 11, Nov. 2007; pp. 4098-4108.

\* cited by examiner

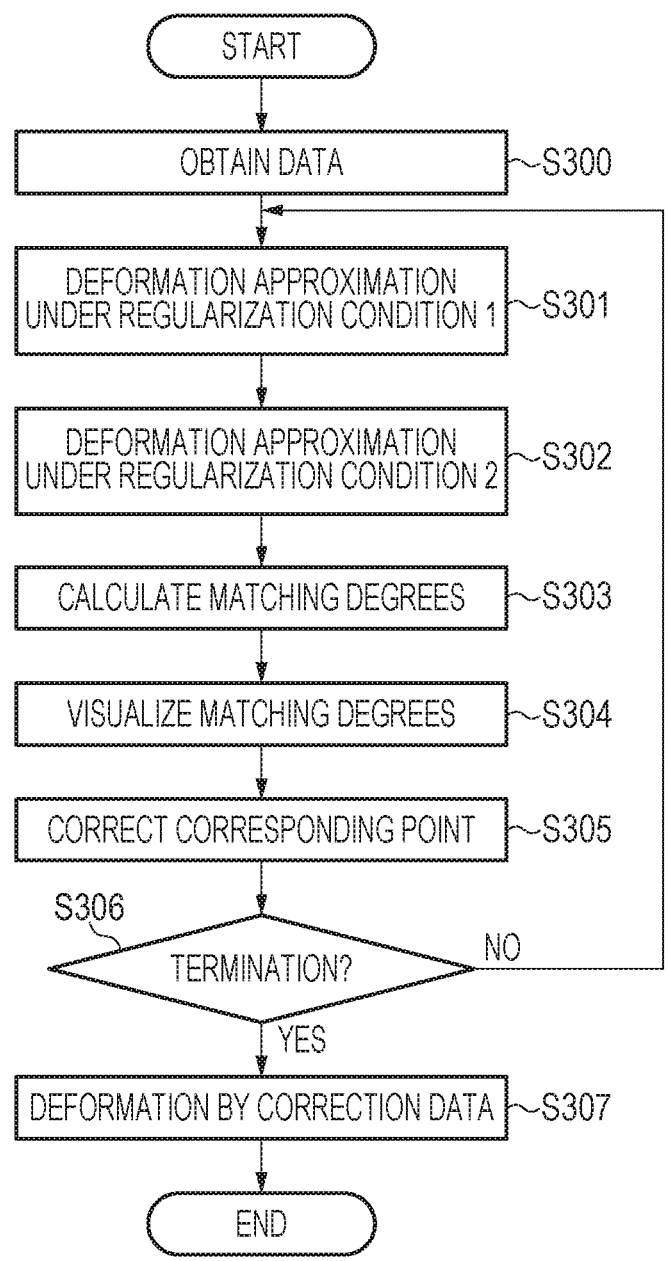

INFORMATION PROCESSING APPARATUS, INFORMATION PROCESSING METHOD, AND STORAGE MEDIUM

BACKGROUND

Field

One disclosed aspect of the embodiments relates to an information processing apparatus, an information processing method, and a storage medium.

Description of the Related Art

In image diagnosis using images captured in a plurality of modalities, different date and times, different body positions, and different imaging modes, positioning of a plurality of images and display and analysis of the positioned images have been proposed. "Nonrigid registration using free-form deformations: application to breast MR images" D. Rueckert, L. Sonoda, C. Hayes, D. Hill, M. Leach, and D. Hawkes, IEEE med. imag., vol. 18(8), pp. 712-721, 1999 discloses a technique of performing deformation positioning for estimating deformation of a subject between images. To realize higher-accuracy positioning, information on corresponding points which are visually associated by a user is obtained and the information on the corresponding points is used in a positioning process. Therefore, different positioning accuracies are obtained depending on accuracy of correspondence.

Therefore, a technique of supporting an operation, performed by a user, of searching an image (hereinafter referred to as a "target image") for a target point specified as described above on another image (hereinafter referred to as a "reference image") and associating the points with each other has been disclosed. Japanese Patent Laid-Open No. 2008-212680 discloses a technique of displaying an estimated position of a target point on a target image in a superposing manner. Furthermore, Japanese Patent Laid-Open No. 2013-198722 discloses a technique of displaying distribution of existence possibility of a target point on a target image in a superposing manner.

However, in the related arts, correctness (a matching degree) of a corresponding point input by the user may be uncertain.

SUMMARY

This disclosure is provided to realize a technique of evaluating a corresponding point input by a user.

This disclosure further provides an operation effect which is obtained by configurations described in "DESCRIPTION OF THE EMBODIMENTS" and which may not be obtained by the related arts.

The disclosed information processing apparatus has configurations below. Specifically, an information processing apparatus includes a processor, and a memory containing instructions that, when executed by the processor, cause the processor to perform operations including obtaining a group of candidates of corresponding points which are pairs of feature points in a first space and feature points in a second space, calculating a plurality of displacement fields under a plurality of different regularization conditions based on the candidate group and to calculate a feature point group which has been subjected to a plurality of displacements by displacing the feature points in the first space by the plurality of displacement fields, and calculating matching degrees of the corresponding points included in the candidate group in accordance with the feature point group which has been subjected to the plurality of displacements.

Further features of the disclosure will become apparent from the following description of exemplary embodiments with reference to the attached drawings.

BRIEF DESCRIPTION OF THE DRAWINGS

FIG. 2 is a flowchart illustrating a procedure of processing performed by the information processing apparatus according to an embodiment.

DESCRIPTION OF THE EMBODIMENTS

Figure 1A:
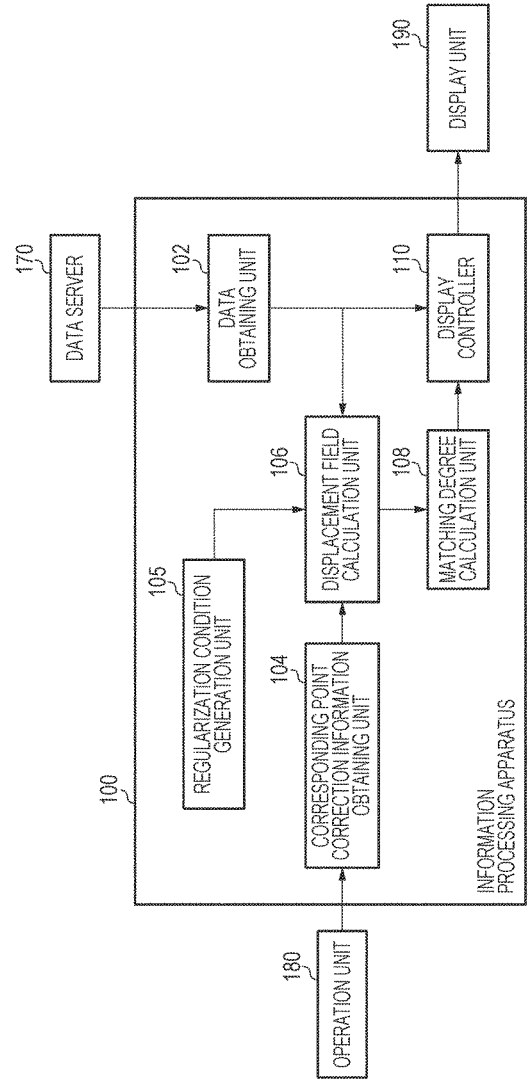
FIGS. 1A and 1B are diagrams illustrating a configuration of an information processing apparatus according to an embodiment.

Hereinafter, preferred embodiments of an information processing apparatus will be described with reference to the accompanying drawings. Note that the disclosure is not limited to examples illustrated in the accompanying drawings.

First Embodiment

An information processing apparatus of this embodiment performs deformation positioning of a plurality of 3D images in accordance with information on corresponding points between the images. In this case, in a group of candidates of the corresponding points among the images specified on the images, degrees of likelihood of correct corresponding points of the candidates are calculated. Then, the calculated degrees are displayed in a form visually recognized by a user. In this embodiment, the degrees of likelihood of the correct corresponding points are referred to as "matching degrees" of the corresponding points. Here, the term "corresponding points" means a pair of two points, that is, a "target point on a first image" and a "point corresponding to the target point on a second image (anatomically the same point)". Furthermore, two points on the first and second images specified by the user as candidates of the corresponding points are referred to as "corresponding point candidates". Furthermore, a group of the corresponding point candidates is referred to as a "corresponding point candidate group". The term "corresponding points" in the context of 3D imaging may also refer to points in the 2D images, obtained from a 3D scene, that are the projections of the same object point in the 3D scene. Furthermore, the term "point" may refer to a portion, a region, a small area, a coordinate position identified by the image coordinates (e.g., x and y coordinates), or any other image features or type that can be identified. Moreover, two corresponding points may refer to points of the same type (in addition to being the projections of the same object point in the 3D scene). For example, for two corresponding points A and B, A and B may both be edge points, line segments, small regions, or coordinate positions.

In this embodiment, a case where 3D images obtained by imaging the same subject under different deformation conditions are used is described as an example. Furthermore, a case where the plurality of 3D images are specifically two 3D images is described as an example. Furthermore, it is assumed that candidates of corresponding points between images are obtained as position coordinates of a characteristic portion (a feature point) in an image manually set by the user, for example. In this case, although a number of the candidates of the corresponding points are pairs of position coordinate values representing correct corresponding points, that is, substantially the same positions in the subject, the candidates may include some wrong corresponding points which are not in substantially the same positions (pairs of two points which are not actual corresponding points, that is, wrong corresponding points). Furthermore, even if the position coordinate values indicate substantially the same positions of the subject, different errors of the candidates of the corresponding points may be obtained in different candidates of the corresponding points. In this case, the wrong corresponding point candidates or the corresponding point candidates having large errors mismatch global displacement represented by other corresponding point candidates.

An information processing apparatus of this embodiment calculates degrees of the mismatch of the individual corresponding point candidates and displays the degrees of the mismatch so as to provide a mechanism of displaying wrong corresponding point candidates and corresponding point candidates having large errors so that the user may visually recognize such corresponding point candidates. In this way, the mechanism may prompt the user to correct such corresponding point candidates. Furthermore, the information processing apparatus of this embodiment includes a configuration of obtaining correction of the corresponding point candidates performed by the user and a configuration of calculating and displaying the matching degrees of the corresponding point candidates after the correction again. Specifically, the information processing apparatus of this embodiment has a configuration in which a group of corresponding point candidates may be corrected while the user recognizes matching degrees of the group of corresponding point candidates.

Hereinafter, a configuration and processing of the information processing apparatus according to this embodiment will be described with reference to FIGS. 1A, 1B, 2, 3A, 3B, 3C, and 3D.

1. Configuration of Information Processing Apparatus

Figure 1B:
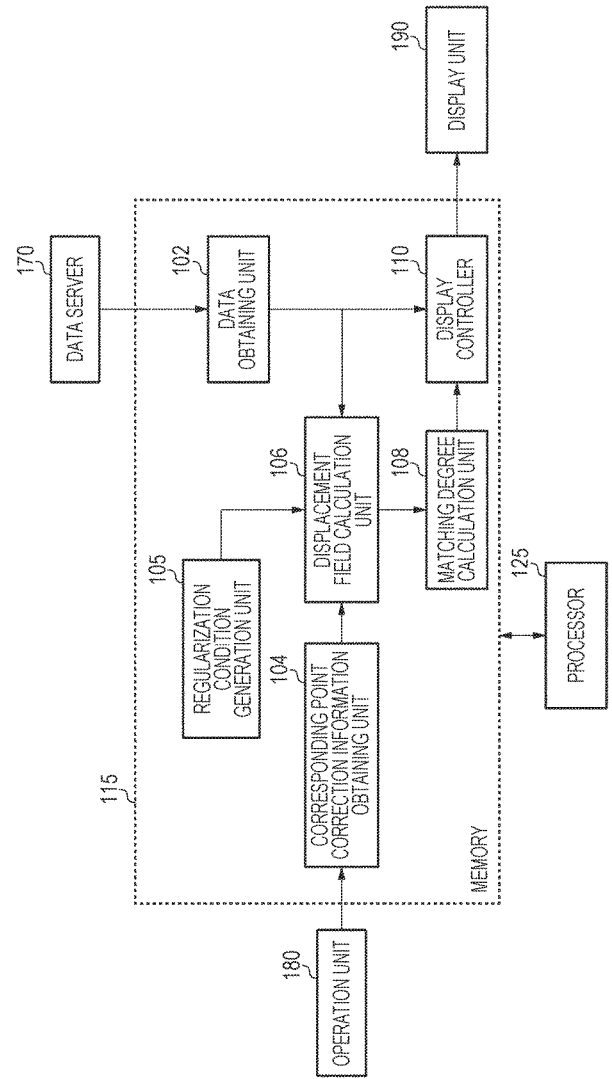

FIGS. 1A and 1B are a block diagram illustrating a functional configuration of an information processing apparatus 100 according to this embodiment. As illustrated in FIG. 1A, the information processing apparatus 100 of this embodiment is connected to a data server 170, an operation unit 180, and a display unit 190 so as to constitute an information processing system as a whole.

The data server 170 is connected to the information processing apparatus 100 through a network and stores first and second images described below. The first and second images stored in the data server 170 are 3D tomographic images obtained by imaging a subject in advance in different conditions (different modalities, different imaging modes, different date and times, different body positions, and the like). Examples of the modalities which generate 3D tomographic images include a magnetic resonance imaging (MRI) apparatus, an X-ray computed tomography (CT) apparatus, a 3D ultrasonic imaging apparatus, a photoacoustic tomography apparatus, positron emission photography/single photon emission computed tomography (PET/SPECT), and an optical coherence tomography (OCT) apparatus. The first and second images may be captured around the same time by different modalities or different imaging modes, or may be obtained by imaging the same patient by the same modality and the same body position in different date and times for follow-up, for example. The first and second images are input to the information processing apparatus 100 through a data obtaining unit 102.

Furthermore, the data server 170 stores information on 3D coordinate values of the individual pairs of corresponding points as information on corresponding point candidates in the first and second images. The data is also input to the information processing apparatus 100 through the data obtaining unit 102. It is assumed that, in the corresponding point candidate group, common ID numbers are assigned to the individual pairs of points on the first and second images which are associated with each other. Specifically, it is assumed that the individual points in the corresponding point candidate group are represented by the ID numbers of the points and 3D coordinates in individual image coordinate systems (three position components in X, Y, and Z in a 3D space).

The operation unit 180 accepts an operation performed by the user on a mouse, a keyboard, or any other input entry device. By this operation, information on correction of a corresponding point candidate specified by the user is input to the information processing apparatus 100 through a corresponding point correction information obtaining unit 104. Furthermore, the user may determine whether a process of correcting a corresponding point is to be terminated through the operation unit 180.

The display unit 190 displays a display image generated by the information processing apparatus 100 and various information including matching degree information. Furthermore, the display unit 190 includes a Graphical User's Interface (GUI) for obtaining instructions or commands from the user.

The information processing apparatus 100 includes the data obtaining unit 102, the corresponding point correction information obtaining unit 104, a regularization condition generation unit 105, a displacement field calculation unit 106, a matching degree calculation unit 108, and a display controller 110. As illustrated in FIG. 1B, each of these units may correspond to a specialized hardware component or a module, stored in a memory 115, having instructions that may be executed by a processor 125 to perform the associated operations. The data obtaining unit 102 obtains the first and second images and the information on the corresponding point candidate group from the data server 170. The corresponding point correction information obtaining unit 104 obtains information on correction of the corresponding point candidate group in the first and second images in accordance with an operation performed by the user on the operation unit 180. The regularization condition generation unit 105 generates a plurality of regularization conditions which are calculation conditions when the displacement field calculation unit 106 calculates a displacement field.

The displacement field calculation unit 106 performs a process of deformation positioning between the first and second images using the corresponding point candidate group in accordance with the individual regularization conditions so as to generate a displacement field for deforming the first image so that positioning between the first and second images is performed. The matching degree calculation unit 108 obtains information on a plurality of displacement fields from the displacement field calculation unit 106 and calculates matching degrees of the corresponding point candidates in the individual corresponding point candidate group in accordance with the information. The display controller 110 performs control for displaying the first and second images and the information on the matching degrees in the display unit 190.

2. Process of Information Processing Apparatus

FIG. 2 is a flowchart of a procedure of a process performed by the information processing apparatus 100 according to this embodiment. Hereinafter, the process in this embodiment will be described in detail.

Step S300: Data Obtainment

In step S300, the data obtaining unit 102 obtains the first and second images and the information on the corresponding point candidate group from the data server 170. Thereafter, the data obtaining unit 102 outputs the information on the corresponding point candidate group to the displacement field calculation unit 106 and outputs the first and second images to the display controller 110.

Figure 3B:
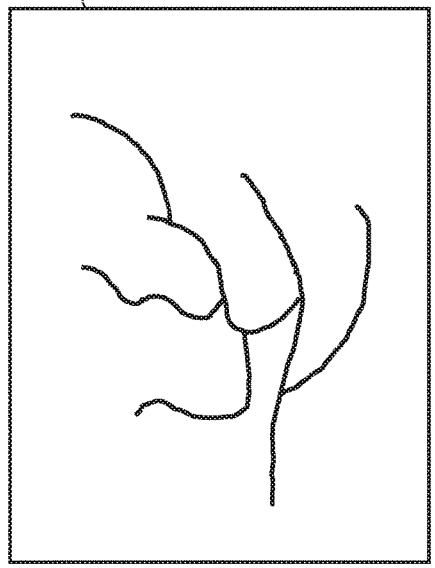
FIGS. 3A to 3D are diagrams illustrating a first image, a second image, and a corresponding point candidate group according to an embodiment.
Figure 3D:
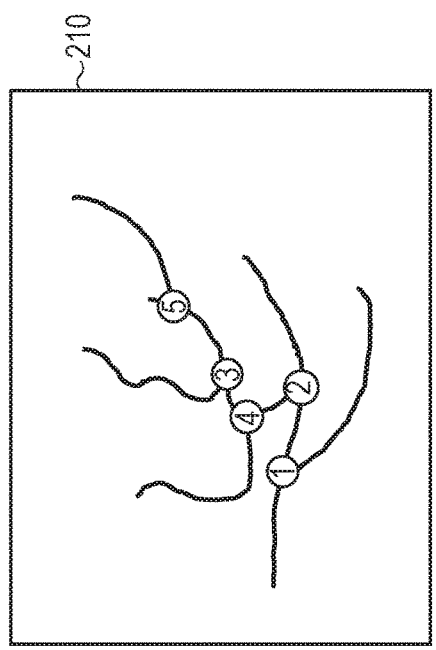
Figure 3A:
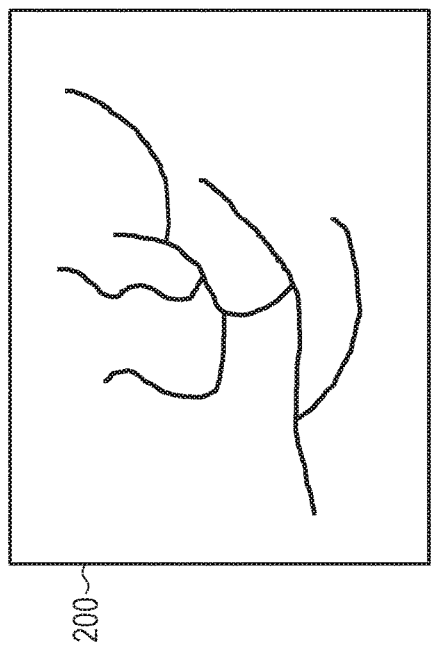

Here, FIGS. 3A to 3D are diagrams illustrating the first and second images and the information on the corresponding point candidate group obtained in this processing step. In FIG. 3A, a first image 200 is obtained by imaging the subject of this embodiment and obtained from the data server 170. Note that, although a 2D image is illustrated as the first image 200 in FIG. 3A for convenience of description in the document, the 2D image represents a cross sectional view of the first image 200 obtained by the data obtaining unit 102 and the first image 200 is actually a 3D image. A case where the first image 200 of this embodiment is a 3D image obtained by imaging a subject by an MRI apparatus will be described as an example. A second image 210 of FIG. 3B is obtained by imaging the same subject of the first image 200. A case where the second image 210 of this embodiment is a 3D image obtained by imaging the subject by a CT apparatus will be described as an example. The first image 200 and the second image 210 are obtained by imaging substantially the same portion of the same subject, and an anatomic structure of the subject, such as a blood vessel, is rendered in similar forms in both of the images. However, a difference may be generated between the structures rendered in the images due to a difference between imaging conditions, such as a difference between body positions of the subject at times of imaging of both of the images.

Figure 3C:
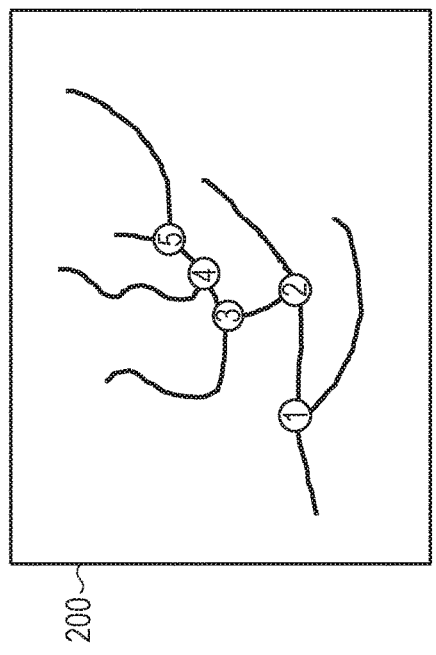

FIGS. 3C and 3D are diagrams illustrating the first image 200 and the second image 210 to which obtained corresponding point candidates (numbers 1 to 5) are assigned. Although all the corresponding points are included in the same flat plane for convenience of the description, the corresponding points are actually distributed also out of the same flat plane. The user observes the first image 200 and the second image 210 and specifies positions on the images in which the same portions of the subject are seen to be rendered in the both of the images as the corresponding point candidates in the images. The corresponding point candidates are recorded and obtained by the data obtaining unit 102. In this embodiment, as illustrated in FIGS. 3C and 3D, a case where the user sets the corresponding point candidates in positions corresponding to nodes of a blood structure of the subject is described as an example.

In FIGS. 3C and 3D, corresponding point candidates 1, 2, and 5 specify correct corresponding positions of the subject, and corresponding point candidates 3 and 4 specify wrong corresponding positions due to a mistake of the user. Specifically, the corresponding point candidates 3 and 4 on the first image 200 conversely correspond to the corresponding point candidates 4 and 3 on the second image 210, respectively. Such wrong corresponding point candidates are obtained not only in the case described above but also in a case where an error is included in positions of arbitrary corresponding points, for example.

In this embodiment, a 3D position coordinate value of a corresponding point candidate in the first image 200 is denoted by $p_i (1 \leq i \leq N)$. Furthermore, a 3D position coordinate value of a corresponding point candidate in the second image 210 is denoted by $q_i (1 \leq i \leq N)$. Here, "N" denotes a total number of corresponding point candidates, and N is 5 in the case of FIGS. 3C and 3D. The same number is assigned to suffixes i of the corresponding point candidates $p_i$ and $q_i$ specified as the same position by the user. Specifically, a pair of $p_1$ and $q_1$, a pair of $p_2$ and $q_2$, and so on are position coordinate values of points set to the first image 200 and the second image 210, respectively, as corresponding positions.

Subsequently, a process after step S301 will be described. In this embodiment, a process from step S301 to step S306 may be repeatedly executed a plurality of times. In this case, in a case where this process is executed for the second time onwards, a portion of the process is different from that executed for the first time. First, the process from step S301 to step S306 executed for the first time is described, and the process executed for the second time onwards will be described hereinafter.

Step S301: Calculation of First Displacement Field

In step S301, the regularization condition generation unit 105 generates a first regularization condition. Then the displacement field calculation unit 106 calculates a first displacement field under the first regularization condition in accordance with information on a current corresponding point candidate group. Then, the displacement field calculation unit 106 outputs the calculated first displacement field to the matching degree calculation unit 108.

The first displacement field is obtained by displacing positions of the corresponding point candidates in the corresponding point candidate group of the first image 200 toward positions of the corresponding point candidates in the corresponding point candidate group of the corresponding second image 210 and spatially correcting the displacement in a smooth manner. The calculation of the displacement field is executed taking a degree of matching of the corresponding point candidate group in the first image 200 and the second image 210 and a degree of the spatial smoothness of the displacement field into consideration so that the matching degree and the degree of the spatial smoothness are balanced. In this case, the first regularization condition is employed as a weight of the two degrees. To calculate the displacement field, in a case where the regularization condition which urges regularization is employed, the degree of the spatial smoothness is relatively more important and the matching degree of the positions in the corresponding point candidate group is relatively less important.

As a concrete method for realizing a method for calculating a displacement field based on the regularization condition described above, a Thin-Plate-Spline (TPS) method and the like may be used.

In the TPS method, a displacement field ϕ which minimizes a cost function of Expression (1) is calculated by a weighted sum of a data item for evaluating the matching degrees in the corresponding point candidate group and a regularization item for evaluating the smoothness of the displacement field by a magnitude of bending energy.

$$E(\Phi) = E_{distance}(\Phi) + \lambda E_{smoothness}(\Phi) \quad (1)$$

Here, a scalar value λ in Expression (1) is a parameter controlling weights of the data item and the regularization item and is referred to as a "regularization parameter" in this embodiment. The displacement field ϕ serves as a function, and a coordinate value x before the displacement may be converted into a coordinate value x' after the displacement through coordinate conversion by calculating Expression (2), for example.

$$x' = x + \Phi(x) \quad (2)$$

Note that the coordinate conversion using the displacement field φ is specifically executed in accordance with Expression (3).

$$\Phi(x) = \sum_{i=1}^{N} w_i U(x, x_i) + \sum_{v=1}^{4} a_v L_v(x) \tag{3}$$

Here, $x_i$ denotes a control point position, $w_i$ denotes a parameter of a nonlinear component defined for each control point, and $a_v(1 \leq v \leq 4)$ denotes a parameter of a linear component defined in an entire space. The displacement field φ is characterized by information on these parameters. In this embodiment, $x_i$, $w_i$, and $a_v$ are individually 3D vectors. Furthermore, a function U(a,b) is a type of radial basis function, and a function of a scalar value calculated based on distances of vectors a and b of the arguments. In this embodiment, a TPS function which is a type of radial basis function is used as the function U(a,b). Furthermore, $L_v$ is a function which returns a vector element value or the like of an argument. In a case of "$x=\{x, y, z\}^T$", "$L_0(x)=x$", "$L_1(x)=y$", "$L_2(x)=z$", and "$L_3(x)=1$" are satisfied. In this embodiment, $w_i$ and $a_v$ are optimized in accordance with the cost function of Expression (1) using a position coordinate value $p_i$ of the corresponding point candidate in the first image 200 using the control point position $x_i$ in Expression (3). Specifically, $w_i$ and $a_v$ which obtain the displacement field φ which minimizes the cost function E(φ) are calculated.

Here, $E_{distance}(\phi)$ in Expression (1) is a data item in the cost function. Specifically, an error of a distance of positions of corresponding points generated due to the coordinate conversion is calculated in accordance with Expression (4).

$$E_{distance}(\Phi) = \sum_{i=1}^{N} \|q_i - \Phi(p_i)\|^2 \tag{4}$$

Furthermore, $E_{smoothness}(\phi)$ in Expression (1) is a regularization item, and bending energy of the displacement field φ is calculated in accordance with Expression (5).

$$E_{smoothness}(\Phi) = \tag{5}$$
$$\int\int\int \left[\left(\frac{\partial^2 \Phi}{\partial x^2}\right)^2 + \left(\frac{\partial^2 \Phi}{\partial y^2}\right)^2 + \left(\frac{\partial^2 \Phi}{\partial z^2}\right)^2 + 2\left(\frac{\partial^2 \Phi}{\partial x \partial y}\right) + 2\left(\frac{\partial^2 \Phi}{\partial x \partial z}\right) + 2\left(\frac{\partial^2 \Phi}{\partial y \partial z}\right)\right] dxdydz$$

A processing procedure in this processing step will be described in detail as below. First, the regularization condition generation unit 105 generates a first regularization parameter $\lambda_1$ as a first regularization condition. Here, the regularization parameter $\lambda_1$ may be an arbitrary positive scalar value but is different from $\lambda_2$ generated by the regularization condition generation unit 105 in step S302 described below as a second regularization condition. Here, a considerably small value may be set as a value of the regularization parameter $\lambda_1$ so that a residual error of the position of the corresponding point after the deformation becomes 0 (that is, $E_{distance}(\phi)=0$). Next, the displacement field calculation unit 106 calculates the displacement field φ which minimizes the cost function E(φ) using the value $\lambda_1$ as λ of the cost function illustrated in Expression (1). Note that, in the case where a solution which attains "$E_{distance}(\phi)=0$" is to be obtained by setting a considerably small value as a value of the regularization parameter $\lambda_1$, the displacement field φ may be calculated by a general TPS solution (a solver by a linear equation) which does not include regularization. In this embodiment, the calculated displacement field is represented as a displacement field $\phi_1$.

Step S302: Calculation of Second Displacement Field

In step S302, the regularization condition generation unit 105 generates a second regularization condition. Then the displacement field calculation unit 106 calculates a second displacement field under the second regularization condition in accordance with information on the current corresponding point candidate group. Then, the displacement field calculation unit 106 outputs the calculated second displacement field to the matching degree calculation unit 108.

The calculation of the second displacement field is executed by a process the same as the calculation of the first displacement field executed in step S301. However, in the calculation of the second displacement field, the second regularization condition which is different from the first regularization condition is employed. Specifically, the regularization condition generation unit 105 generates a regularization parameter $\lambda_2$ which is the second regularization condition as follows: $\lambda_2=\lambda_1+\Delta\lambda$. Here, $\Delta\lambda$ denotes a predetermined small positive scalar value representing a difference between the first and second regularization conditions. A concrete process of generating the second displacement field based on the second regularization condition performed by the displacement field calculation unit 106 is the same as the process in step S301, and therefore, a detailed description thereof is omitted. As a result of the execution of this processing step, the second displacement field $\phi_2$ is calculated.

Step S303: Calculation of Matching Degree

In step S303, the matching degree calculation unit 108 calculates matching degrees of the individual corresponding point candidates in the corresponding point candidate group using the first displacement field $\phi_1$ calculated in step S301 and the second displacement field $\phi_2$ calculated in step S302. The calculated matching degrees are output to the display controller 110.

Here, the matching degree is a value obtained by indexing likelihood of correspondence. A small numerical value is set to a matching degree of a corresponding point candidate having displacement which hardly occurs in an actual subject, for example.

First, the matching degree calculation unit 108 calculates positional information by displacing individual position coordinates $p_i$ in the corresponding point candidate group in the first image 200 by the displacement field $\phi_1$ calculated in step S301. Specifically, a calculation process in Expression (6) is executed.

$$p'_i = p_i + \Phi_1(p_i) \tag{6}$$

The obtained positional information is denoted by $p'_i$ and referred to as corresponding point candidate positions after first displacement (a feature point group after first displacement).

Subsequently, the matching degree calculation unit 108 calculates positional information by displacing the individual position coordinates $p_i$ of the corresponding point candidate group in the first image 200 by the displacement field $\phi_2$ calculated in step S302. Specifically, a calculation process in Expression (7) is executed.

$$p''_i = p_i + \Phi_2(p_i) \quad (7)$$

This positional information $p''_i$ is referred to as corresponding point candidate positions after second displacement (a feature point group after second displacement).

Furthermore, the matching degree calculation unit 108 executes a calculation process of Expression (8) on the individual corresponding point positions after the first displacement and the individual corresponding point positions after the second displacement so as to obtain matching degrees $c_i$.

$$c_i = -\|p'_i - p''_i\|^2 \quad (8)$$

Here, the matching degrees $c_i$ are associated with the individual corresponding point candidates in the corresponding point candidate group, and more specifically, are matching degrees of the corresponding point candidates included in the entire corresponding point candidate group.

Step S304: Visualization of Matching Degrees

In step S304, the display controller 110 executes a display control process of displaying the first image 200, the second image 210, and information on the matching degrees in the corresponding point candidate group for the user.

In this process, images are generated by individually performing volume rendering on the first image 200 and the second image 210 and superposing marks on positions in the corresponding point candidate group in the generated images. Here, a color and a size of the marks superposed on the positions in the corresponding point candidate group and a display form, such as flashing, are changed in accordance with the matching degrees of the corresponding point candidates so that the user may visually recognize differences among the matching degrees. Alternatively, numerical values of the matching degrees may be displayed as characters in the positions of the corresponding point candidates.

Furthermore, an arbitrary threshold value may be set for the matching degrees of the corresponding point candidates and only correspondence point candidates having matching degrees smaller than the threshold value (having large absolute values) may be displayed so that the user may visually recognize corresponding point candidates which are highly required to be corrected. Furthermore, a position of a corresponding point candidate having a low matching degree may be set to the center of a rendering image or the position may be displayed in a zooming manner. Alternatively, the first image 200 and the second image 210 may not be displayed but marks may be displayed in positions of the corresponding point candidates in a 3D image space so that only information on the matching degrees is displayed.

The method for generating a display image is not limited to the method described above. For example, cross-sectional images may be generated by cutting the first and second images by arbitrary planes and marks may be displayed in the form described above on the corresponding point candidate positions in the cross-sectional images. Here, positions of the planes for cutting the first and second images may be changed in accordance with a user operation so that cross sections in various positions in the images are displayed.

Furthermore, the positions of the planes may be changed in accordance with the matching degrees of the corresponding point candidates so that images obtained by cutting the images in positions of corresponding point candidates having low matching degrees are displayed. For example, the corresponding point candidates may be sorted in accordance with the values of the matching degrees, and images of certain cross-sections (axial cross-sections) of the first and second images including corresponding point candidates of the smallest matching degrees may be displayed in an aligned manner in response to a user's instruction. Furthermore, the display may be switched in response to a user's instruction so that the same display is performed for corresponding point candidates having the second smallest matching degrees. Similarly, the display may be performed while corresponding point candidates may be changed in turn in ascending order of the matching degrees.

Furthermore, as the display of the matching degrees, a pair of an ID of a corresponding point candidate and a matching degree may be displayed in a console or the like as text information instead of graphical display representing distribution of the positions of the corresponding point candidates described above. In this case, the information may be displayed in order of IDs of the corresponding point candidates or in ascending order of the matching degrees of the corresponding point candidates after the values of the matching degrees are sorted. Furthermore, only the corresponding point candidates having the matching degrees equal to or smaller than a threshold value may be displayed.

By the method described above, the display controller 110 generates a display image such that the user may visually recognize the matching degrees of the corresponding point candidates and displays the display image in the display unit 190 under control of the display controller 110.

Step S305: Correction of Corresponding Points by User

In step S305, the corresponding point correction information obtaining unit 104 executes a process of obtaining correction information of the corresponding point candidate group in accordance with operation information of the operation unit 180 operated by the user. Then the corresponding point correction information obtaining unit 104 executes a process of changing information on the corresponding point candidate group recorded in the information processing apparatus 100 in accordance with the obtained correction information.

For example, the corresponding point correction information obtaining unit 104 may obtain a user operation performed on a mouse or a keyboard included in the operation unit 180 and perform correction on the positional information of the corresponding point candidate group in accordance with the user operation. In this case, a GUI may be arranged on the display image displayed in the display unit 190 in step S304 and correction may be performed on the positional information of the corresponding point candidate group in accordance with a user operation performed on the GUI. For example, the positions of the corresponding point candidates on the display image may be moved in accordance with a mouse operation performed by the user and positional information of the corresponding point candidates may be changed in accordance with the positions after the movement.

Furthermore, the information obtained by the corresponding point correction information obtaining unit 104 may indicate deletion of an arbitrary corresponding point included in the corresponding point candidate group or addition of a corresponding point, for example, in addition to the correction of the positional information. For example, the user is allowed to select an arbitrary corresponding point candidate included in the corresponding point candidate group using the GUI of the display image and a "deletion" button is disposed as another GUI. In this state, when the user presses the "deletion" button, a corresponding point candidate being selected may be deleted. Furthermore, a button used to terminate the correction operation may be disposed as a still another GUI in the display image, and when the user presses the button, the process of this processing step may be terminated.

Step S306: Termination Determination

In step S306, the information processing apparatus 100 determines whether a loop of a process from step S301 to step S306 which is repeatedly executed in this embodiment is to be terminated. The determination may be made in response to an input instruction indicating termination or continuance based on a user operation. When it is determined that the loop is to be terminated, the processing step proceeds to step S307, and otherwise, the processing step returns to step S301.

By the processing described above, the repetitive process from step S301 to step S306 according to this embodiment is executed for the first time.

The process from step S301 to step S306 performed for the second time onwards is different from the process performed for the first time in the following point. The processes in step S301 and step S302 are executed based on the corresponding point candidate group which has been subjected to the correction in the process in step S305 in the preceding loop process. In the other processes, the processes executed for the first time are executed.

By the processing described above, the process from step S301 to step S306 is executed.

Step S307: Deformation Due to Correction Data

In step S307, the displacement field calculation unit 106 performs a deformation positioning process on the first and second images using the information on the corresponding point candidate group updated in the processing described above. Specifically, the displacement field calculation unit 106 generates a displacement field for deforming the first image so that positioning between the first image and the second image is performed. Furthermore, a deformation image is generated by deforming the first image based on the displacement field. The generated displacement field and the generated displacement image are transmitted through a communication unit, not illustrated, and stored in the data server 170. Furthermore, the information processing apparatus 100 stores the information on the corresponding point candidate group updated by the process described above in the data server 170 through the communication unit.

Here, the generation of the displacement field may be performed by the process in step S301. Here, the value used in step S301 (that is, $\lambda_1$) may be used as a value of the regularization parameter $\lambda$. Note that the displacement field in this case is the same as that finally obtained in step S301, and therefore, a calculation of the displacement field may be omitted. Furthermore, another value may be used as the regularization parameter $\lambda$. For example, a considerably small value may be set as a value of the regularization parameter $\lambda$ so that a residual error of a position of a corresponding point after the deformation becomes 0. Furthermore, an arbitrary positioning method (different from that in step S301) based on the information on the corresponding points may be used. The process of this step does not require an interactive operation performed by the user, and therefore, a higher-accuracy positioning method, such as Free Form Deformation (FFD) which requires a nonlinear optimization calculation which requires a longer calculation time than TPS, may be used. Furthermore, positioning additionally using information other than information on the corresponding points, such as information on matching degrees of luminance values, as a cost function may be performed.

As described above, the process of the information processing apparatus according to this embodiment is executed. According to this embodiment, the user may visually recognize the matching degrees of the corresponding point candidates in the corresponding point candidate group with ease. Furthermore, the user may perform correction on the corresponding point candidates based on the matching degrees. Specifically, the user may set the corresponding point candidate group having a high matching degree (less mismatching) with ease. As a result, the positioning may be performed with high accuracy.

Modification 1-1: Variation of Matching Degree Calculation Method

In this embodiment, the case where the calculation of Expression (8) is executed based on the distances between the corresponding point positions after the displacement based on the first and second displacement fields has been described as the method for calculating the matching degree $C_i$ in step S303. However, embodiments of the disclosure are not limited to this, and in step S303, the matching degree calculation unit 108 may calculate matching degrees of the corresponding point candidates in accordance with a different method based on the first and second displacement fields. For example, the matching degree calculation unit 108 may calculate the matching degrees "$c_i = -\|\phi_1(p_i) - \phi_2(p_i)\|^2$" in accordance with a difference between a displacement amount $\phi_1(p_i)$ based on the first displacement field and a displacement amount $\phi_2(p_i)$ based on the second displacement field. Furthermore, the matching degree calculation unit 108 may calculate the matching degrees based on a predetermined function associated with distances between the corresponding point positions after the displacement based on the first and second displacement fields as represented by Expression (9).

$$c_i = f_{distribution}(\|p'_i - p''_i\|) \qquad (9)$$

Here, "$f_{distribution}$ is an arbitrary distribution function and Gaussian distribution may be used, for example. Furthermore, an appropriate characteristic of the distribution function $f_{distribution}$ is preferably set taking previous knowledge including complication of deformation of a target subject into consideration. According to this method, the matching degrees may be calculated with higher accuracy.

Modification 1-2: Automatic Deletion of Points Having Low Matching Degrees

In this embodiment, the case where the matching degrees calculated in the process in step S303 are displayed for the user in the process in step S304 and the user performs the correction in step S305 has been described as an example. However, embodiments of the disclosure are not limited to this. For example, the information processing apparatus 100 may include a corresponding point correction unit, not illustrated, which determines effectiveness of the individual corresponding point candidates in the corresponding point candidate group based on the matching degrees calculated in the process in step S303 and corrects the corresponding point candidate group based on the determination. More specifically, as a next process of step S303, the corresponding point correction unit performs a process of determining whether each of the matching degrees of the corresponding point candidates in the corresponding point candidate group calculated in step S303 is equal to or smaller than a predetermined threshold value and deleting corresponding point candidates having matching degrees equal to or smaller than the threshold value from the corresponding point candidate group. Accordingly, correction may be performed by deleting the corresponding point candidates having the low matching degrees without a correction process performed by the user. Note that the display controller 110 may display "deletion candidates" and the user may delete only the "deletion candidates" approved by the user.

A method for deleting the corresponding point candidates having the low matching degrees based on the values of the matching degrees is not limited to the method described above, and a corresponding point candidate which has a matching degree lower than the predetermined threshold value and which has the lowest matching degree in the corresponding point candidate group, for example, may be deleted. Furthermore, the deletion process described above and the process of calculating the matching degrees described in step S301 to step S303 may be repeatedly executed. With this method, the corresponding point candidate group may be corrected such that the matching degrees of the individual corresponding point candidates in the corresponding point candidate group becomes equal to or larger than the predetermined threshold value.

Modification 1-3: Maintaining of Difference Vector and Displaying of Direction of Correction of Mismatching Point While In this embodiment, a case where a need of the correction of the corresponding point candidates is displayed for the user by displaying the matching degrees of the corresponding point candidates is described as an example. However, embodiments of the disclosure are not limited to this. In addition to the need of the correction of the individual corresponding point candidates, a guide of a direction (orientation) of correction of the positions of the corresponding point candidates and reference information, for example, may be displayed. More specifically, in step S303, the matching degree calculation unit 108 may calculate, in addition to the process of calculating the matching degrees $c_i$, candidate vectors $v_i$ in the correction direction in accordance with a calculation process of Expression (10).

$$v_i = p''_i - p'_i \tag{10}$$

Furthermore, in step S304, the display controller 110 may display guide information represented by an arrow mark in which a direction thereof is changed based on the calculated vectors $v_i$ on the corresponding point candidates and in the vicinity of the corresponding point candidates in the generated display image. By this method, the correction directions which are considerably affected by matching degrees may be displayed for the user in the correction of the positions of the corresponding point candidates. Therefore, a clue of the correction of the corresponding point candidates may be offered to the user, and accordingly, a load of the user who gives the correction information may be reduced.

Here, a viewpoint position or a posture of the rendering of the display image may be changed or a cross-sectional position or a posture at a time of display of the cross-sectional images may be changed in accordance with the calculated vectors $v_i$. In a case where a volume rendering image is to be generated as the display image, an eye direction of volume rendering may be set to be orthogonal to the vectors $v_i$. Furthermore, in a case where a cross-sectional image is to be generated as the display image, a cutting position and a posture of the cross-sectional image may be adjusted such that the vectors $v_i$ are included in an in-plane of the cross-sectional image. By these methods, the user may visually recognize the correction direction of the corresponding point candidates with ease, and the load of the correction performed by the user may be further reduced.

Second Embodiment: Case of Volume Preservation

Regularization Using FFD

A second embodiment will be described mainly in a point different from the first embodiment. A configuration of an information processing system according to this embodiment is the same as that of the first embodiment illustrated in FIGS. 1A and 1B. Furthermore, a processing procedure of an information processing apparatus 100 in this embodiment is the same as that of the first embodiment illustrated in the flowchart of FIG. 2. However, processes executed by a regularization condition generation unit 105 and a displacement field calculation unit 106 in step S301 and step S302 are different from those of the first embodiment. Hereinafter, the processes in step S301 and step S302 executed by the information processing apparatus 100 according to this embodiment will be described.

Step S301: Calculation of First Displacement Field

In step S301, the regularization condition generation unit 105 generates a first regularization condition. Then the displacement field calculation unit 106 calculates a first displacement field under the first regularization condition in accordance with information on a current corresponding point candidate group. Then, the displacement field calculation unit 106 outputs the calculated first displacement field to a matching degree calculation unit 108.

The displacement field of this embodiment is represented by a free form deformation (FFD) method. In the FFD method, control points are arranged in a grid manner, and displacement amounts in a space are calculated based on control amounts of the control points. A process of the calculation may be realized by a general method, and therefore, a detailed description thereof is omitted. Here, a method for calculating the control amounts which define characteristics of the displacement field in the FFD method will be described.

In this embodiment, the displacement field calculation unit 106 calculates a displacement field $\phi$ which minimizes a cost function illustrated in Expression (11).

$$E(\Phi) = E_{distance}(\Phi) + \lambda_{bending} E_{bending}(\Phi) + \lambda_{compression} E_{compression}(\Phi) \tag{11}$$

In Expression (11), $E_{distance}(\phi)$ is a data item in the cost function and is the same as that in Expression (4) described in the first embodiment, and therefore, a description thereof is omitted here. Furthermore, in Expression (11), $E_{bending}(\phi)$ is a regularization item associated with bending energy and is the same as $E_{smoothness}(\phi)$ described with reference to Expression (5) of the first embodiment, and therefore, a description thereof is omitted here. In Expression (11), $E_{compression}(\phi)$ is a regularization item associated with a local volume change in spatial conversion caused by the displacement field $\phi$. Furthermore, $\lambda_{bending}$ and $\lambda_{compression}$ in Expression (11) are a regularization parameter associated with the bending energy and a regularization parameter associated with the volume change, respectively.

In this embodiment, $E_{compression}(\phi)$ is obtained in accordance with Expression (12) below, for example.

$$E_{compression}(\Phi) = \int_{\Omega} |\log[\det\{J(\Phi)\}]| dx \tag{12}$$

Here, $J(\phi)$ denotes a function which returns a Jacobian matrix of 3 rows by 3 columns which is space derivative of the displacement field $\phi$. Furthermore, det( ) is a function for obtaining a determinant of a matrix of arguments. Expression (12) calculates a degree of a local volume change in the spatial conversion caused by the displacement field $\phi$ and represents a calculation for spatially integrating the degree of the local volume change.

In this processing step, the regularization condition generation unit 105 generates $\lambda_{bending}$ and $\lambda_{compression}$ illustrated in Expression (11) as a first regularization condition. In this embodiment, $\lambda_{bending}$ and $\lambda_{compression}$ of the first regularization condition are described as $\lambda_{bending1}$ and $\lambda_{compression1}$. As values of $\lambda_{bending}$ and $\lambda_{compression}$, predetermined positive scalar values may be used. Here, at least one of the values $\lambda_{bending}$ and $\lambda_{compression}$ may be 0. Specifically, a regularization condition indicating that regularization is not performed may be set as the first regularization condition.

Next, the displacement field calculation unit 106 calculates a first displacement field $\phi_1$ by optimizing an evaluation reference which is minimization of the cost function illustrated in Expression (11) using $\lambda_{bending1}$ and $\lambda_{compression1}$. Note that examples of an optimization calculation executed for the calculation of the displacement field $\phi_1$ include arbitrary nonlinear optimization methods, such as a steepest descent method.

Step S302: Calculation of Second Displacement Field

In step S302, the regularization condition generation unit 105 generates a second regularization condition. Then the displacement field calculation unit 106 calculates a second displacement field under the second regularization condition in accordance with information on a current corresponding point candidate group. Then, the displacement field calculation unit 106 outputs the calculated second displacement field to the matching degree calculation unit 108.

The calculation of the second displacement field is executed by a process the same as that of the calculation of the first displacement field executed in step S301. However, in the calculation of the second displacement field, the second regularization condition which is different from the first regularization condition is employed.

Specifically, the regularization condition generation unit 105 generates $\lambda_{bending2}$ and $\lambda_{compression2}$ which are different from $\lambda_{bending1}$ and $\lambda_{compression1}$ which are the first regularization condition. Here, a concrete method for generating the values $\lambda_{bending2}$ and $\lambda_{compression2}$ is the same as that of the first embodiment.

Specifically, the values $\lambda_{bending2}$ and $\lambda_{compression2}$ are generated by adding predetermined small positive scalar values to the regularization parameters $\lambda_{bending1}$ and $\lambda_{compression1}$, respectively, which are the first regularization condition. A concrete process of calculating the displacement field under the second regularization condition performed by the displacement field calculation unit 106 is the same as the process in step S301, and therefore, a detailed description thereof is omitted. As a result of execution of this processing step, a second displacement field $\phi_2$ is calculated.

In this way, the process of the information processing apparatus according to the second embodiment is executed. According to this embodiment, a plurality of displacement fields are calculated under different regularization conditions associated with volume change of the displacement fields. Then matching degrees of the corresponding point candidates in the corresponding point candidate group are calculated based on the displacement fields. By this, the matching degrees of the corresponding point candidates in the corresponding point candidate group of the subject in which a local volume change is assumed to be small may be calculated in terms of the local volume change.

Modification 2-1: Use of Rigidity Instead of Jacobian

In the processes in step S301 and step S302 in this embodiment, the case where the displacement fields are calculated under the regularization condition associated with the bending energy and the regularization condition associated with the local volume change is described as an example. However, embodiments of the disclosure are not limited to this. A degree of deviation from the rigidity, for example, may be used as the regularization condition. As disclosed in "A rigidity penalty term for nonrigid registration", Marius Staring, Stefan Klein, and Josien P. W. Pluim, Med. Phys. 34(11), November 2007, the displacement field may be calculated using a cost function including regularization associated with linearity of the displacement field, orthonormality, and volume preservation. According to this method, in a case where a target subject locally has deformation which is not considerably different from rigidity conversion, a system for calculating matching degrees taking deformation characteristics of the subject into consideration may be offered.

Modification 2-2: Use of Jacobian and Rigidity.

Calculation of 2D Matching Degrees by FFD Approximation Under Conditions 1 to 3 (Example: Mismatching is Detected when Scores of Jacobian and Rigidity are Both Low.)

In this embodiment, the case where the matching degrees are calculated using the displacement field generated under two different types of regularization condition is described as an example, embodiments of the disclosure are not limited to this. For example, the matching degrees may be calculated using displacement fields generated under the three different types of regularization condition. For example, the following process may be performed.

First, in the process in step S301, the regularization condition generation unit 105 generates $\lambda_{bending1}$ and $\lambda_{compression1}$ as predetermined positive values as the first regularization condition associated with the cost function of Expression (11). Thereafter, the displacement field calculation unit 106 calculates a first displacement field $\phi_1$ under the first regularization condition.

Next, in the process in step S302, the regularization condition generation unit 105 generates a second regularization condition in accordance with calculations "$\lambda_{bending2}=\lambda_{bending1}+\Delta\lambda_{bending}$" and "$\lambda_{compression2}=\lambda_{compression1}$". Here, $\Delta\lambda_{bending}$ is a prescribed positive value which finely varies $\lambda_{bending}$.

Thereafter, the displacement field calculation unit 106 calculates a second displacement field $\phi_2$ under the second regularization condition. Furthermore, the regularization condition generation unit 105 generates a third regularization condition in accordance with the following calculation: $\lambda_{bending3}=\lambda_{bending1}$ and $\lambda_{compression3}=\lambda_{compression1}+\Delta\lambda_{compression}$. Here, $\Delta\lambda_{compression}$ is a prescribed positive value which finely varies $\lambda_{compression}$. Thereafter, the displacement field calculation unit 106 calculates a third displacement field $\phi_3$ under the third regularization condition.

Then, in the process in step S303, the matching degree calculation unit 108 calculates matching degrees in accordance with the first to third displacement fields. For example, the process in step S303 of this embodiment is executed based on the first and second displacement fields so that first matching degrees are obtained. Furthermore, the process in step S303 of this embodiment is executed based on the first and third displacement fields so that second matching degrees are obtained.

Thereafter, matching degrees are obtained by integrating the first and second matching degrees. For example, matching degrees may be obtained by integrating smallest values of the first and second matching degrees of the corresponding point candidates. According to this method, the user may visually recognize corresponding point candidates which are mismatched in terms of the bending energy or the volume preservation in accordance with the viewpoints of the bending energy and the volume preservation. Although the case based on the three types of regularization condition is described in the example described above, embodiments of the disclosure are not limited to this and four or more types of regularization conditions may be used.

OTHER EMBODIMENTS

Embodiment(s) of the disclosure can also be realized by a computer of a system or apparatus that reads out and executes computer executable instructions (e.g., one or more programs) recorded on an article of manufacture comprising a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)), such as the processor 125 shown in FIG. 1B, and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. The RAM and/or the ROM may be the memory 115 shown in FIG. 1B.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-244397 filed Dec. 15, 2015, which is hereby incorporated by reference herein in its entirety.

What is claimed is:

1. An information processing apparatus comprising:
a processor; and
a memory containing instructions that, when executed by the processor, cause the processor to perform operations comprising:
obtaining a candidate group having a group of candidates of corresponding points which are pairs of feature points in a first image and feature points in a second image;
calculating a plurality of displacement fields under a plurality of different regularization conditions based on the candidate group and to calculate a feature point group which has been subjected to a plurality of displacements by displacing the feature points in the first image by the plurality of displacement fields; and
calculating matching degrees of the corresponding points included in the candidate group in accordance with the feature point group which has been subjected to the plurality of displacements,
wherein the first and second images are obtained from one or more imaging apparatuses and correspond to a portion of a subject.

2. The information processing apparatus according to claim 1, wherein calculating matching degrees comprises calculating matching degrees of the corresponding points included in the candidate group in accordance with distances between positions of the feature points included in the feature point group which has been subjected to the plurality of displacements.

3. The information processing apparatus according to claim 1, wherein the plurality of different regularization conditions include a regularization condition associated with bending energy of a displacement field.

4. The information processing apparatus according to claim 2, wherein the plurality of different regularization conditions include a regularization condition associated with bending energy of a displacement field.

5. The information processing apparatus according to claim 1, wherein the plurality of different regularization conditions include a regularization condition associated with volume preservation of a displacement field.

6. The information processing apparatus according to claim 2, wherein the plurality of different regularization conditions include a regularization condition associated with volume preservation of a displacement field.

7. The information processing apparatus according to claim 1, wherein one of the plurality of different regularization conditions is a regularization condition indicating that regularization is not performed.

8. The information processing apparatus according to claim 2, wherein one of the plurality of different regularization conditions is a regularization condition indicating that regularization is not performed.

9. The information processing apparatus according to claim 1, further comprising a display controller configured to display information on the matching degrees in a display unit.

10. The information processing apparatus according to claim 2, further comprising a display controller configured to display information on the matching degrees in a display unit.

11. The information processing apparatus according to claim 3, further comprising a display controller configured to display information on the matching degrees in a display unit.

12. The information processing apparatus according to claim 4, further comprising a display controller configured to display information on the matching degrees in a display unit.

13. The information processing apparatus according to claim 5, further comprising a display controller configured to display information on the matching degrees in a display unit.

14. The information processing apparatus according to claim 9,
wherein calculating a plurality of displacement fields further comprises calculating information on a direction of correction of the corresponding points included in the candidate group, and the display controller causes the display unit to display information on the correction direction.

15. The information processing apparatus according to claim 1, wherein the operations further comprises obtaining information on correction of the candidate group in response to a user operation, and executing a process of correcting the information on the candidate group in accordance with the correction information.

16. The information processing apparatus according to claim 1, wherein the operations further comprise deleting corresponding points having matching degrees equal to or smaller than a threshold value.

17. An information processing method comprising:

obtaining, from a data server, a candidate group having a group of candidates of corresponding points which are pairs of feature points in a first image and feature points in a second image;

calculating a plurality of displacement fields under a plurality of different regularization conditions based on the candidate group and calculating a feature point group which has been subjected to a plurality of displacements by displacing the feature points in the first image by the plurality of displacement fields; and calculating matching degrees of the corresponding points included in the candidate group in accordance with the feature point group which has been subjected to the plurality of displacements, wherein the first and second images are obtained from one or more imaging apparatuses and correspond to a portion of a subject.

18. An information processing apparatus comprising:

a processor; and a memory containing instructions that, when executed by the processor, cause the processor to perform operations comprising:

obtaining a candidate group having a group of candidates of corresponding points which are pairs of feature points in a first image and feature points in a second image;

calculating a plurality of displacement fields under a plurality of different regularization conditions based on the candidate group; and calculating matching degrees of the corresponding points included in the candidate group based on differences between the displacement amounts of the feature points in the first image in the plurality of displacement fields, wherein the first and second images are obtained from one or more imaging apparatuses and correspond to a portion of a subject.

19. An information processing method comprising:

obtaining, from a data server, a candidate group having a group of candidates of corresponding points which are pairs of feature points in a first image and feature points in a second image;

calculating a plurality of displacement fields under a plurality of different regularization conditions based on the candidate group; and calculating matching degrees of the corresponding points included in the candidate group based on differences between the displacement amounts of the feature points in the first image in the plurality of displacement fields, wherein the first and second images are obtained from one or more imaging apparatuses and correspond to a portion of a subject.

20. A non-transitory storage medium that stores instructions that, when executed by a processor, cause the processor to execute operations of the information processing method set forth in claim 17.

* * * * *